G. BEANE.
DAMPER REGULATOR.
No. 180,522. Patented Aug. 1, 1876.
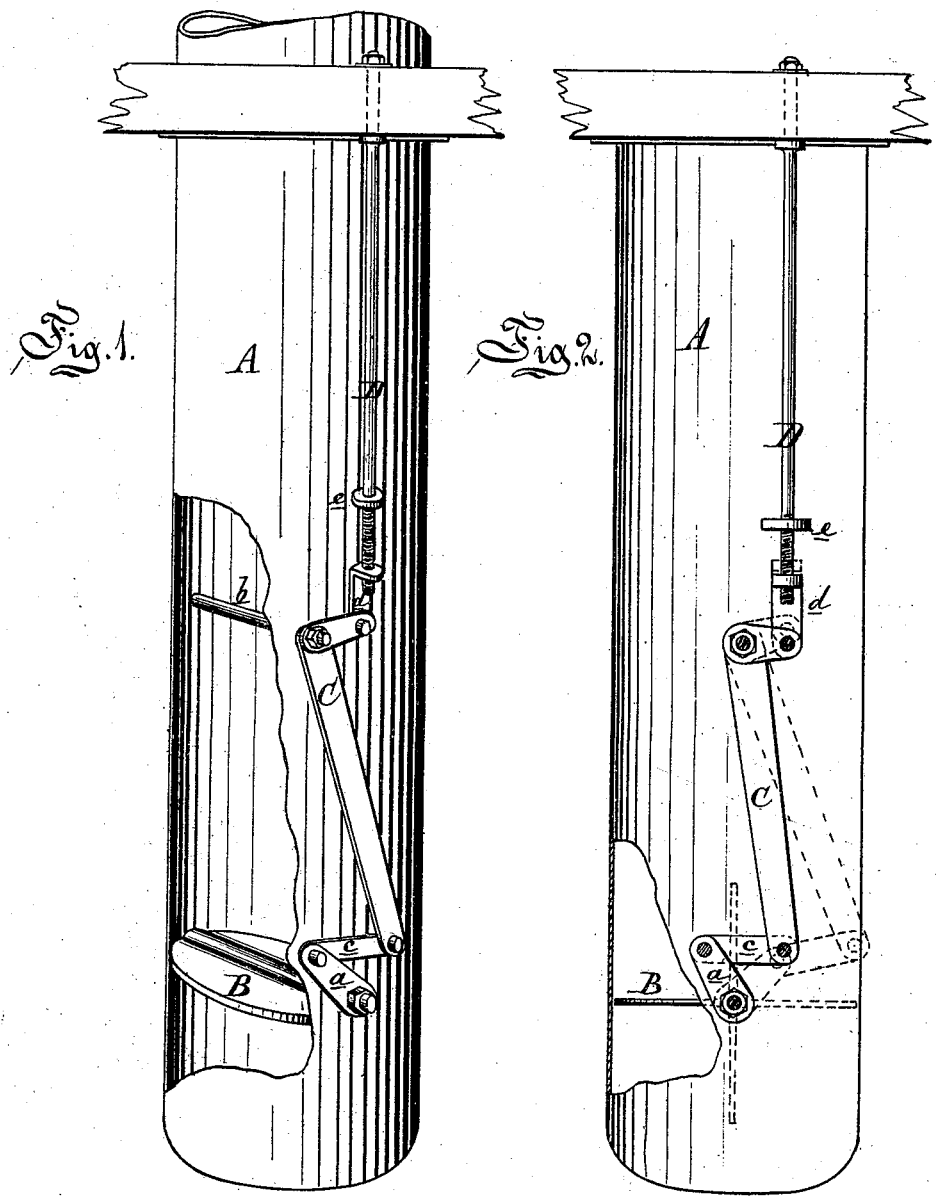

UNITED STATES PATENT OFFICE.

GEORGE BEANE, OF WINDSOR, ONTARIO, CANADA.

IMPROVEMENT IN DAMPER-REGULATORS.

Specification forming part of Letters Patent No. 180,522, dated August 1, 1876; application filed January 7, 1876.

*To all whom it may concern:*

Be it known that I, GEORGE BEANE, of Windsor, in the county of Essex and Province of Ontario, Canada, have invented an Improvement in Damper-Regulators for Stove-Pipes, of which the following is a specification:

My invention has for its object to provide a damper-regulating device for a stove-pipe, which will automatically open and close the damper as the pipe contracts or expands under changes of temperature; and it consists in the peculiar devices for adjusting such damper and operating the same, all as more fully hereinafter explained.

Figure 1 is a perspective view of the device as attached to a section of stove-pipe, which is partially broken out to show the damper. Fig. 2 is a sectional side elevation.

In the drawing, A represents a stove-pipe, fitted with an ordinary damper, B, having a short crank, a, on the outer end of its spindle. C is a bent lever, pivoted at its angle to a spindle, b, which passes through the pipe. The long arm of this lever is connected by a link, c, with the crank a, while the short arm has a strap, d, pivoted to it, the upper end of which is bent to a right angle, and has a screw-threaded hole tapped in it to receive the threaded end of a rod, D, whose upper end is secured to the ceiling, or to some other stationary object, but in such a manner that the said rod can be rotated by a hand-wheel, e, to adjust the damper, which, when the pipe is cold, should stand open; then, as the pipe expands from heat, a very slight movement of the pipe will, through the sweep of the long arm of the lever, produce a much greater movement of the damper-crank in the direction to close the latter. As the pipe contracts again the damper will reopen.

What I claim as my invention is—

1. The combination, with the stove-pipe A, the damper, and a system of levers, of the screw-threaded rod D to adjust such damper, substantially as described and shown.

2. The combination, with the stove-pipe A, of the damper B, crank a, link c, lever C, and rod D, the several parts being constructed, arranged, and operated substantially as described and shown.

GEORGE BEANE.

Witnesses:
H. F. EBERTS,
H. S. SPRAGUE.